United States Patent [19]

Morehouse

[11] 3,912,892

[45] Oct. 14, 1975

[54] AUTOMOBILE DECELERATION WARNING SYSTEM

[76] Inventor: Melvin D. Morehouse, 24240 Los Codona, Walteria, Calif. 90505

[22] Filed: Jan. 18, 1974

[21] Appl. No.: 434,376

[52] U.S. Cl. .............................. 200/61.89; 340/69
[51] Int. Cl.² ........................................ H01H 3/14
[58] Field of Search ............ 200/61.89; 340/69, 71, 340/72, 56, 55

[56] References Cited
UNITED STATES PATENTS

| | | | |
|---|---|---|---|
| 2,685,005 | 7/1954 | Anderson | 200/61.89 |
| 2,707,214 | 4/1955 | Kaleba | 200/61.89 |
| 2,750,462 | 6/1956 | Milster | 200/61.89 |
| 2,832,863 | 4/1958 | Quimby | 200/61.89 |
| 3,171,917 | 3/1965 | Leichsenring | 340/71 X |

Primary Examiner—Donald J. Yusko
Attorney, Agent, or Firm—Harris, Kern, Wallen & Tinsley

[57] ABSTRACT

A deceleration warning system for an automotive vehicle which energizes the brake lights of the vehicle whenever the driver releases the pressure of his foot from the accelerator pedal. The system includes an auxiliary pedal overlying and movably connected to the accelerator pedal and engageable by the driver's foot, and switch means responsive to the removal of the pressure of the driver's foot from the auxiliary pedal for energizing the brake lights of the vehicle.

2 Claims, 2 Drawing Figures

AUTOMOBILE DECELERATION WARNING SYSTEM

BACKGROUND OF INVENTION

Automotive vehicles, such as automobiles, trucks, buses, and the like, are provided with brake or stop lights which are visible from the rear thereof and which are energized upon actuation of the brake system of the vehicle. In some instances, the brake lights are energized by a switch which is closed mechanically by the brake pedal upon a slight depression thereof. In others, the switch for energizing the brake lights is actuated hydraulically by the hydraulic pressure built up in the brake system upon application of the brakes by the driver.

The brake or stop lights are intended to warn the driver of a following vehicle that the driver of the vehicle ahead is in the act of applying his brakes, or has applied his brakes. The reaction time of the driver of the following vehicle determines how quickly he will apply his own brakes in response to such a warning, which reaction time, on the average, is at least a substantial fraction of a second. If the vehicles are traveling at high speed and/or if the following driver is too close to the vehicle ahead, the following driver may not be able to react quickly enough to the energization of the brake lights of the vehicle ahead to avoid locking his wheels, with the attendant possibility of skidding, or, in the extreme case, to avoid a rear end collision. Incidents of this nature are commonplace in everyday traffic.

OBJECTS AND SUMMARY OF INVENTION

With the foregoing background in mind, the primary object of the present invention is to provide the following driver with additional time to react to the fact that the driver ahead is decelerating, or may be about to decelerate.

More particularly, an important object of the invention is to provide an automotive vehicle having means for energizing the brake lights thereof in response to removal of the pressure of the driver's foot from the accelerator pedal of the vehicle.

With the foregoing, a following driver is warned of deceleration, or potential deceleration, of the vehicle ahead as soon as the driver of the leading vehicle releases the accelerator pedal. This earlier warning gives the driver of the following vehicle more time to react, a factor which will greatly reduce rear end collisions and/or excessively hard stops by the following driver, which is an important feature.

The invention may be summarized as including, and another important object of the invention is to provide a warning system which includes: auxiliary switch means controlling the brake lights; and means responsive to the removal of accelerator pedal pressure by the driver's foot for causing such auxiliary switch means to energize the brake lights.

More particularly, an important object of the invention is to provide an auxiliary pedal overlying and movably connected to the accelerator pedal and engageable by the driver's foot, and switch means responsive to the release of the auxiliary pedal by the driver's foot for energizing the brake lights.

A more specific object is to provide a construction wherein the switch means includes a normally closed switch carried by the auxiliary pedal and engageable with the accelerator pedal and openable by the application of pressure to the auxiliary pedal by the driver's foot, the switch closing automatically upon the release of foot pressure to energize the brake lights.

Yet another object is to provide a construction wherein the auxiliary pedal is pivotally mounted on the accelerator pedal.

The invention may be further summarized as including an assembly which comprises: an auxiliary pedal engageable by a driver's foot and adapted to overlie the accelerator pedal; mounting means for movably mounting the auxiliary pedal on the accelerator pedal; and switch means actuable by pressure of the driver's foot on the auxiliary pedal.

The foregoing objects, advantages, features and results of the present invention, together with various other objects, advantages, features and results which will be evident to those skilled in the art to which the invention relates in the light of this disclosure, may be achieved with the exemplary embodiment of the invention illustrated in the accompanying drawing and described in detail hereinafter.

DESCRIPTION OF EXEMPLARY EMBODIMENT OF INVENTION

Figure 1:
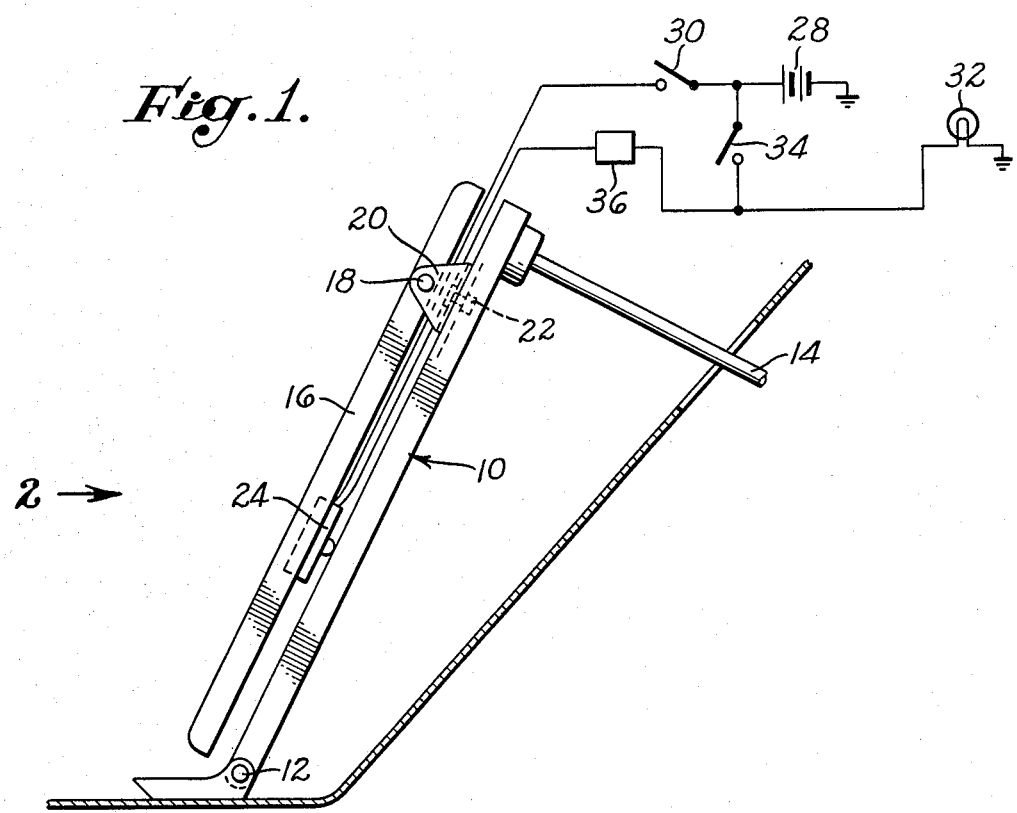
FIG. 1 is a partially schematic view showing an accelerator pedal of an automotive vehicle in side elevation with the invention mounted thereon.
Figure 2:
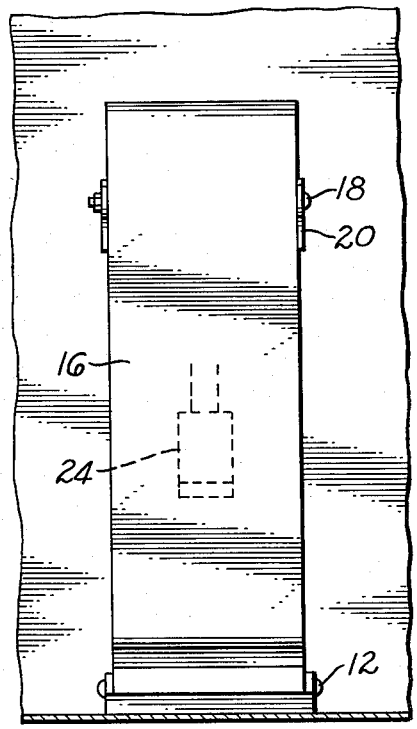
FIG. 2 is an elevational view taken as indicated by the arrow 2 of FIG. 1 of the drawing.

Referring to the drawing, illustrated therein is a conventional accelerator pedal 10 pivotally mounted at 12 and having connected thereto a link 14 suitably connected to the carburetor, not shown, of the engine of an automotive vehicle and adapted to control the delivery of power from the engine through the drive train of the vehicle to the driving wheels thereof, all of which is well known.

Overlying, and preferably substantially coextensive with, the accelerator pedal 10 is an auxiliary pedal 16 engageable by the driver's foot. The auxiliary pedal 16 is pivotally mounted on the accelerator pedal 10 by a pivot means 18 carried by a bracket 20 secured to the accelerator pedal 10 by a rivet 22, or the like.

Mounted on the auxiliary pedal 16 at a point spaced from the pivot means 18 is an auxiliary brake light switch means 24 which comprises a normally closed switch carried by the auxiliary pedal and engageable with the accelerator pedal 10. As will be apparent, pressure of the driver's foot on the auxiliary pedal 16 opens the switch 24, while removal of such foot pressure permits the switch 24 to close.

The auxiliary switch 24 is connected in series with the battery 28, ignition switch 30 and brake lights 32 of the vehicle, only one brake light being shown for convenience. The conventional brake light switch is designated by the numeral 34 and is connected in series with the battery 28 and the brake lights 32, and in parallel with the ignition switch 30.

With the foregoing construction, it will be apparent that as long as the driver's foot exerts pressure on the auxiliary pedal 16, the auxiliary switch 24 is open, and the brake lights 32 are deenergized. However, as soon as the driver releases the auxiliary pedal 16, the auxiliary switch 24 automatically closes to energize the brake lights 32, thereby providing a following driver with an added warning that the vehicle ahead is decelerating, or may decelerate. As previously explained, this additional warning, over and above the warning provided by closure of the conventional brake light switch 34, tends to avoid such things as excessively hard stops by a following driver, or even a rear end collision. Preferably, the auxiliary switch 24 does not close until the driver's foot completely disengages the accelerator pedal assembly comprising the pedals 10 and 16.

As previously explained, the auxiliary switch 24 is in series with the ignition switch 30. As will be apparent, this prevents energization of the brake lights 32 when the vehicle is parked.

It will be understood, of course, that the switch 24 may, if desired, be built into, or mounted on, the existing accelerator pedal 10, for newly manufactured vehicles, for example.

Another feature of the invention is that a resistor 36 may be placed in series with the auxiliary switch 24 and the brake lights 32. Such resistor reduces the current flow to the brake lights 32, and makes them somewhat dimmer, in response to closure of the auxiliary switch 24, than they are in response to closure of the conventional brake light switch 34, it being noted that the resistor 36 and the switch 34 are in parallel. This feature tells a following driver that the driver ahead has released his accelerator pedal, but has not yet applied his brakes. Such additional information is frequently useful to a following driver since he is alerted to the fact that the driver ahead has released his accelerator pedal and may apply his brakes.

Although an exemplary embodiment of the invention has been disclosed for illustrative purposes, it will be understood that various changes, modifications and substitutions may be incorporated in such embodiment without departing from the invention as hereinafter claimed.

I claim:

1. In combination with a conventional accelerator pedal mounted in an automotive vehicle by a first pivot means and having a connection to a carburetor of the vehicle:
    a. an auxiliary pedal overlying and substantially coextensive with the accelerator pedal and actuable by a driver's foot;
    b. a second pivot means, independent of and spaced from said first pivot means, pivotally mounting said auxiliary pedal on said accelerator pedal, the axes of said first and second pivot means being substantially parallel; and
    c. switch means carried by said auxiliary pedal and engaging said accelerator pedal and actuable by the pressure of a driver's foot on said auxiliary pedal.

2. The combination defined in claim 1 wherein said switch means includes a normally closed switch mounted on said auxiliary pedal and engageable with the accelerator pedal so as to be openable in response to pressure of the driver's foot on said auxiliary pedal.

* * * * *